United States Patent [19]
Adams et al.

[11] Patent Number: 5,730,346
[45] Date of Patent: Mar. 24, 1998

[54] STRAP ASSEMBLY AND BRACKET FOR A SECURING AND STORING SYSTEM

[75] Inventors: Robert R. Adams, Reading; Robert D. Hellyer, Dingmans Ferry, both of Pa.

[73] Assignee: It's A Cinch, Inc., Doylestown, Pa.

[21] Appl. No.: 759,423

[22] Filed: Dec. 5, 1996

[51] Int. Cl.$^6$ .................................................. B60R 9/02
[52] U.S. Cl. ................... 224/556; 224/318; 224/484; 224/572; 248/499
[58] Field of Search ........................ 224/547, 556, 224/563, 557, 572, 318, 482, 484; 248/499, 500, 503, 505

[56] References Cited

U.S. PATENT DOCUMENTS

| | | |
|---|---|---|
| 2,196,341 | 4/1940 | Rush . |
| 2,635,796 | 4/1953 | Davolt .................. 224/556 X |
| 3,533,588 | 10/1970 | Cregier . |
| 3,722,911 | 3/1973 | Rhody . |
| 4,108,342 | 8/1978 | Riva .................... 224/556 X |
| 4,253,594 | 3/1981 | Parks ................... 224/318 |
| 4,596,348 | 6/1986 | Stamp .................. 224/546 X |
| 4,765,521 | 8/1988 | Finnegan . |
| 4,826,193 | 5/1989 | Davis ................... 248/499 X |
| 4,942,989 | 7/1990 | Miller . |
| 5,230,449 | 7/1993 | Collins et al. ......... 224/556 X |

FOREIGN PATENT DOCUMENTS 1 296 880  11/1972  United Kingdom .

*Primary Examiner*—Renee S. Luebke
*Attorney, Agent, or Firm*—Miller & Christenbury

[57] ABSTRACT

A strap assembly is provided for securing an object adjacent to a vehicle. The strap assembly includes an elongated strap of predetermined length. An anchor is attached to the strap at a location along its length. The anchor is shaped to be captured by panels of a vehicle so that opposed ends of the strap extend outwardly from the vehicle. A fastener is connected to one of the opposed ends of the strap and is adapted for connecting the ends to secure one or more objects. A bracket is preferably provided so that the strap assembly can be used to secure objects adjacent to a structure. In a preferred embodiment, the strap assembly and bracket are provided in the form of a kit so that the strap assembly can be used to secure objects adjacent to a vehicle or adjacent to a structure.

21 Claims, 6 Drawing Sheets

STRAP ASSEMBLY AND BRACKET FOR A SECURING AND STORING SYSTEM

BACKGROUND OF THE INVENTION

This invention relates to a device that is capable of securing an object to a vehicle. It also relates to a device that is capable of securing an object to a structure. This invention further relates to a kit that is capable of securing an object to a vehicle or to a structure.

FIELD OF THE INVENTION

From time to time, there arises a need to transport objects that cannot easily or safely fit within the interior of a vehicle. For example, it may be necessary to transport elongated objects such as lumber or pipe from one place to another. Such objects frequently will not fit within the interior of vehicles such as cars, vans and smaller trucks.

Various attempts have been made in the past to provide devices for transporting such objects. For example, in U.S. Pat. No. 4,108,342, a carrier attachment for automobiles is proposed. The carrier attachment includes a line or cable formed in a closed loop with a loop at both ends. A retaining plug is secured to the line at one loop for placement in the engine or trunk compartment. The other loop projects outwardly and serves as an anchor or tie-down point by which a separate rope or line is used to surround cargo such as lumber or pipe. Two such carrier attachments are intended to be mounted on the automobile roof with a separate line to connect the oppositely disposed loops to each other in order to hold down roof-supported cargo.

A similar device is proposed in U.S. Pat. No. 4,253,594, which proposes an anchor strap for carrying articles on the top of a vehicle. The anchor strap has opposite ends which are looped. One end is sized to receive within the loop a core which can be anchored within the frame of the automobile. The free end is connected to a second anchor strap by means of a tie rope.

A unitarily-formed carrier member is proposed in U.S. Pat. No. 4,596,348. The carrier member is formed from a resilient material such as neoprene and includes a thickened first end, a second end and a sheet-like intermediate portion. The first end is provided for placement interiorly of a joint formed between a moveable panel and a fixed panel of an automobile. The second end includes a reinforced portion defining an aperture. A separate rope is passed through the aperture to form a slipknot for engaging the rope to the carrier. The rope is long enough to suspend a carried elongated object.

These proposed devices share significant disadvantages. For example, each must be used in conjunction with a separate component such as a separate rope, line for tie member. This makes the devices cumbersome to use. Also, if a separate rope is not available, then the devices simply cannot be used in their intended manner.

U.S. Pat. No. 4,826,193 proposes a wheelchair restraint that is intended to restrain wheelchairs against the wall of a hallway while being easily and quickly releasable. A bracket is attached to a wall. A T-shaped metallic lug member is provided with a slot so that it can be slid over a strap. The strap is provided with buckles so that the opposed ends of the strap can be anchored on separate support rails of a wheelchair. The T-shaped lug member is inserted into the bracket so that a rib portion projects out of a slot in the bracket. The T-shaped lug member and strap are not adapted, however, for use with a vehicle to transport objects.

OBJECTS OF THE INVENTION

It is an object to provide a strap assembly for securing an object to a vehicle.

It is another object to provide a bracket for a strap assembly so that the strap assembly can be used to mount an object adjacent to a structure.

It is yet another object to provide a kit that can be used to secure an object to a vehicle and to secure an object to a structure.

Other objects of the invention are apparent in view of the description of the invention, the drawings and the appended claims.

SUMMARY OF THE INVENTION

This invention provides a strap assembly for securing an object to a vehicle wherein a portion of the strap assembly is captured by a panel of the vehicle and a portion of the strap assembly engages the object so that it can be transported safely and easily with the vehicle. The strap assembly includes an elongated strap, an anchor attached to the elongated strap at a location along its length, and a fastener connected to one end of the elongated strap. In operation, the anchor is captured by panels of the vehicle and the ends of the elongated strap extend outwardly from the vehicle. The fastener is used to connect the ends of the elongated strap so that the object is secured adjacent to the vehicle.

This invention also provides a bracket for mounting the strap assembly adjacent to a structure. The bracket defines an interior region shaped and sized to accommodate the anchor of the strap assembly. An opening is provided in the bracket to receive the anchor and a slot is provided to receive a portion of the strap so that the ends of the strap extend outwardly from the bracket. The fastener of the strap assembly is used to connect the ends of the strap so that an object can be secured adjacent to the structure.

This invention also provides a kit for securing an object adjacent to a vehicle and for securing an object adjacent to a structure. The kit includes a strap assembly as well as a bracket.

DETAILED DESCRIPTION OF THE INVENTION

Figure 1:
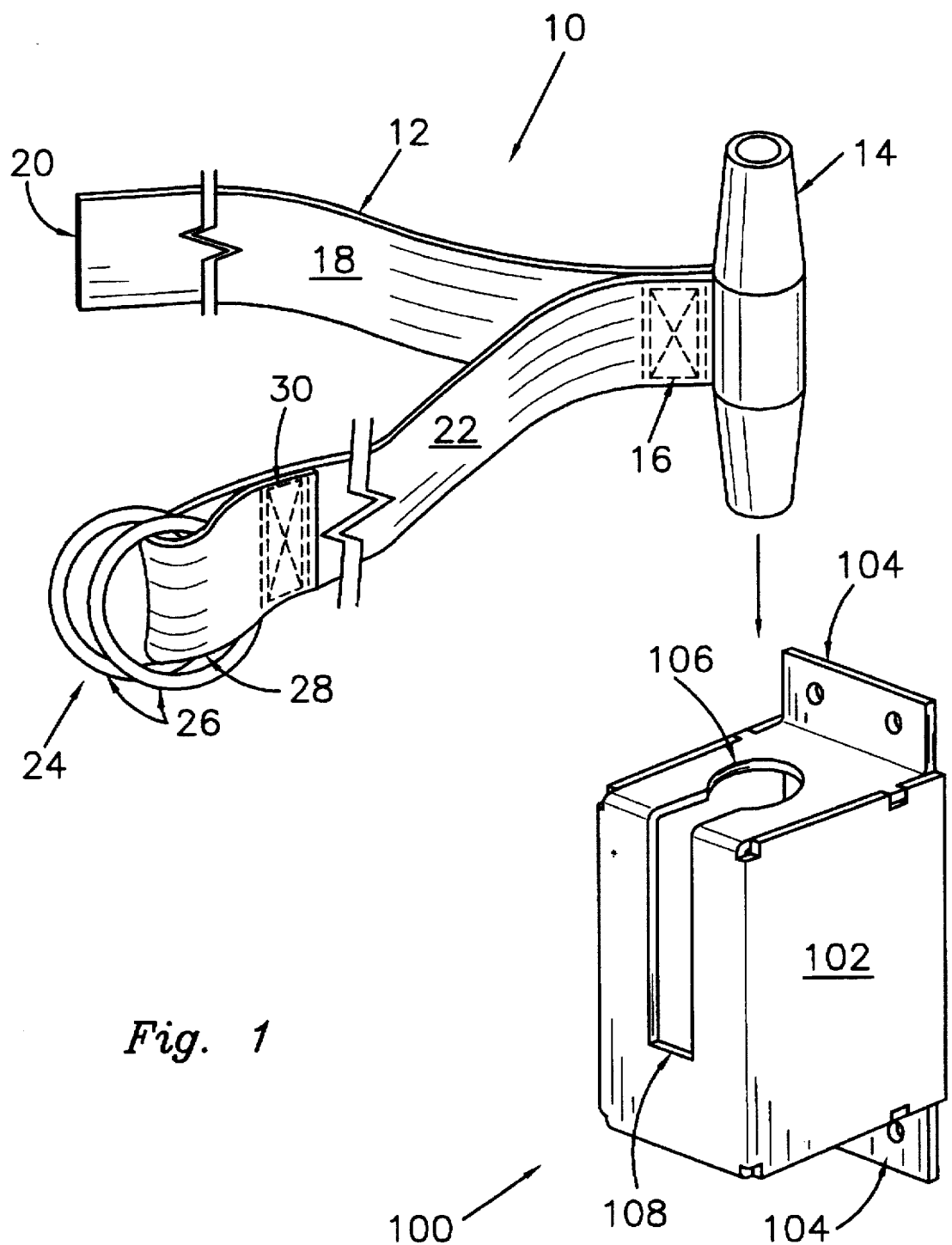
FIG. 1 shows a perspective view of an embodiment of a kit including a strap assembly and a bracket according to this invention.

The following description is intended to refer to the specific embodiments of the invention illustrated in the drawings. This description is not intended to define or limit the scope of the invention, which is defined separately in the claims that follow. Also, the drawings are not to scale and various dimensions and proportions are contemplated.

Referring to FIG. 1, an embodiment of a kit according to this invention is illustrated. The kit includes a strap assembly designated by the numeral "10" and a bracket generally designated by the numeral "100". Although a kit is illustrated, this invention is not limited to a kit including the strap assembly and bracket together. It is intended that the strap assembly can be used alone and independent from the bracket.

Strap assembly 10 includes an elongated strap 12 that is preferably formed of a material that has a high tensile strength. For example, elongated strap 12 is preferably formed from a woven fabric of ribbed structure, although other materials are contemplated. Strap assembly 10 also includes an anchor 14, preferred embodiments of which will be described in detail with reference to FIGS. 2 and 3.

Elongated strap 12 is attached to anchor 14, and anchor 14 is captured with respect to the strap 12, by means of a sewn or stitched connection 16. Elongated strap 12 is wrapped around anchor 14 within a channel formed in the surface of anchor 14 (as will be described hereinafter) and the strap is then stitched to itself to permanently attach it to anchor 14. Alternatively, elongated strap 12 is provided with a sewn connection 16 in order to form a loop which is then slid over an end of anchor 14. Preferably, the inside diameter of the loop is slightly smaller or the same as the outside diameter of anchor 14 when measured at the channel to maintain tension on the loop to thereby secure strap 12 to anchor 14. It is also contemplated that other means of securing strap 12 to anchor 14 may be used such as melt adherence, staples, grommets and the like.

By means of the connection of elongated strap 12 to anchor 14, a first length 18 of the elongated strap is formed, which terminates at an end 20. Also formed is a second length 22 of elongated strap 12 which terminates at a fastener 24.

In the embodiment shown in FIG. 1, fastener 24 comprises two metallic rings 26. Rings 26 are connected to second length 22 by means of a loop 28 formed by a sewn or stitched connection 30. Loop 28 is alternatively secured by melt adherences, staples, grommets and the like. Rings 26 are used to connect an end portion of first length 18 to an end portion of second length 22. Rings 26 are used in the conventional manner. Alternatively, other known fasteners can be used instead of, or in conjunction with, rings 26. For example, a spring clamp or spring clasp is optionally used at the end of second length 22 in order to engage an end portion of first length 18. Any other known fastener or buckle can be substituted so long as it can connect the first and second lengths to engage an object positioned between the first and second lengths.

Figure 8:
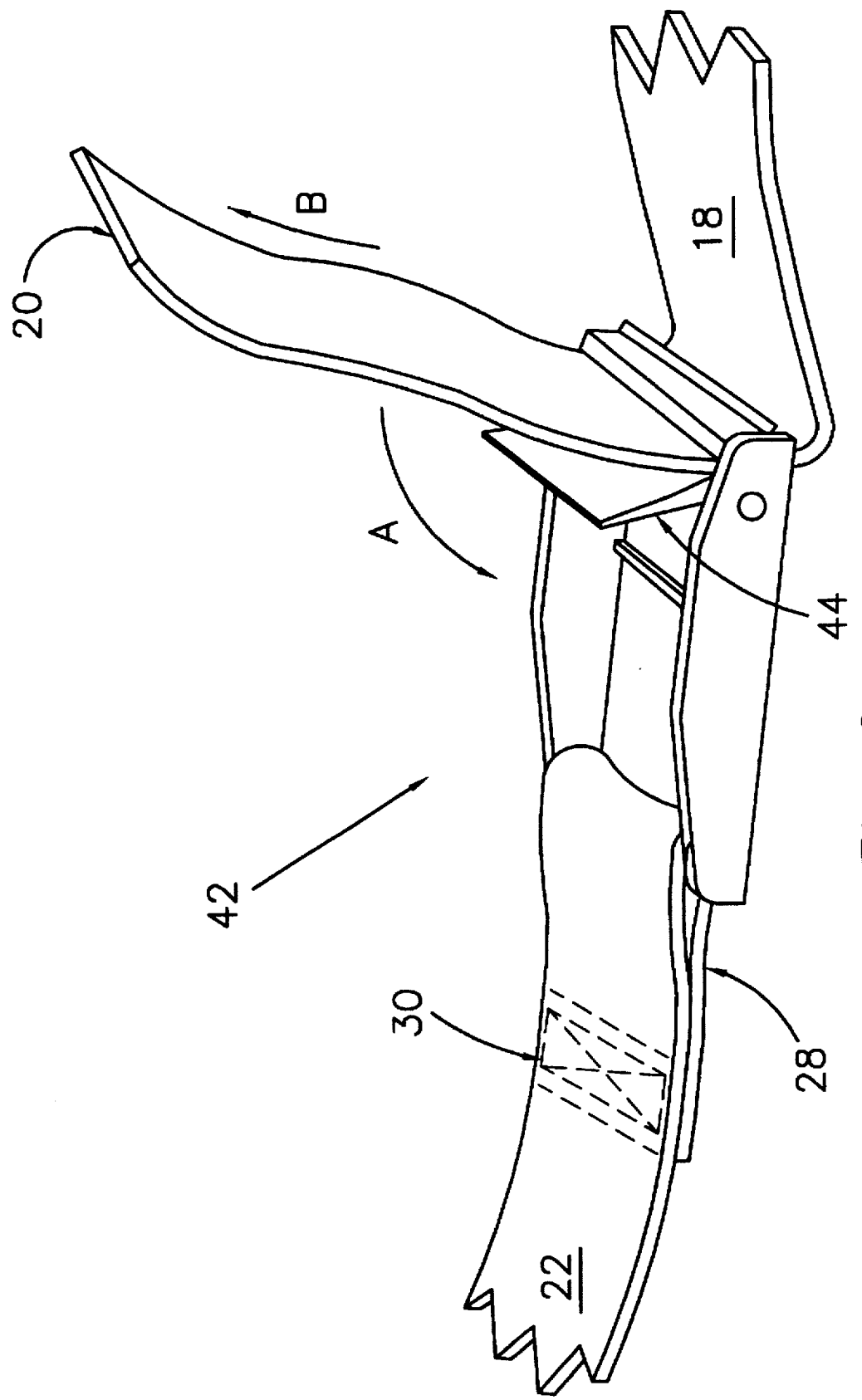
FIG. 8 shows a perspective view of another embodiment of a fastener component capable of use on the strap assembly embodiment shown in FIG. 1.

FIG. 8 illustrates another embodiment of a fastener generally designated by the numeral "42" that is optionally used instead of rings 26. Fastener 42 is attached to second length 22 of elongated strap 12 by means of loop 28 and sewn connection 30.

Fastener 42 is a spring clasp such as those commonly available from hardware suppliers and the like. It has a lever 44 that is spring-biased toward a vertical position. Lever 44 rotates in the direction indicated by the arrow "A" so that end 20 of first length 18 of elongated strap 12 can be inserted through the clasp in the direction indicated by the arrow "B". Release of lever 44 brings lever 44 into clamping engagement with first section 18 and prevents the unintentional release of first section 18 from spring clasp 42.

In this manner, first and second sections 18 and 22 of elongated strap 12 are used to engage one or more objects. Other fasteners and fastening methods are contemplated as well.

Preferably, first length 18 is considerably longer than second length 22 so that it can be wrapped around one or more objects as will be described later with reference to FIGS. 6 and 7. The anchor 14 is positioned at a predetermined location along the length of elongated strap 12 and the elongated strap 12 and anchor 14 are permanently connected at that predetermined location. First length 18 and second length 22 are permanently established by selecting a predetermined location for anchor 14 along the length of the elongated strap.

Also shown in FIG. 1 is one preferred embodiment of a bracket 100 that is adapted to be mounted to a structure such as a wall, ceiling or other portion of a building. It includes a bracket housing 102 as well as two mounting portions 104 which are provided as a means for mounting bracket 100 to a structure. Bracket 100 also includes an opening 106 as well as a slot 108 extending from the opening 106. Opening 106 is sized and shaped to receive anchor 14 of strap assembly 10 so that anchor 14 fits completely within bracket housing 102. Slot 108 is sized and shaped to receive a portion of elongated strap 12 so that first length 18 and second length 22 of elongated strap 12 can extend from anchor 14 within bracket housing 102 and through slot 108. In use, when bracket 100 is securely attached to a structure, anchor 14 of strap assembly 10 can be positioned within bracket housing 102 in order to secure strap assembly 10 adjacent to the structure for the mounting or storage of one or more objects.

Figure 2:
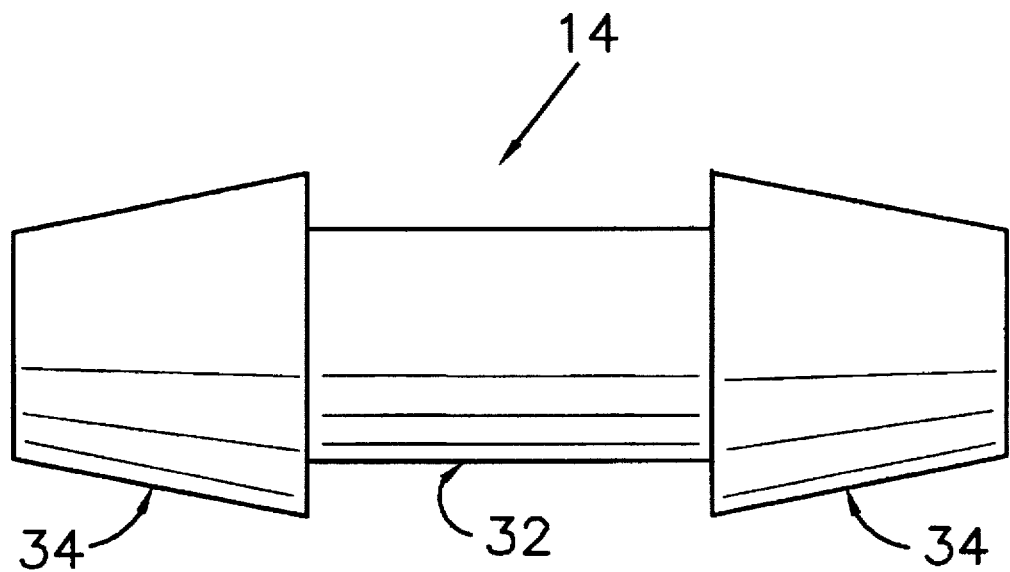
FIG. 2 shows a side view of an embodiment of an anchor component of the strap assembly embodiment shown in FIG. 1.

Referring now to FIG. 2, an embodiment of anchor 14 is illustrated. This embodiment is preferably formed from plastic and has a channel 32 about its circumference. Anchor 14 is preferably hollow. Also, tapers 34 run from a location adjacent to channel 32 to the ends of anchor 14. Tapers 34 permit the insertion of a preformed loop in elongated strap 12 over the end of anchor 14 until it is slid into place within channel 32. As such a loop "snaps" into place in channel 32, it cannot be removed from anchor 14 and the strap cannot be moved along the longitudinal axis of anchor 14.

Figure 3:
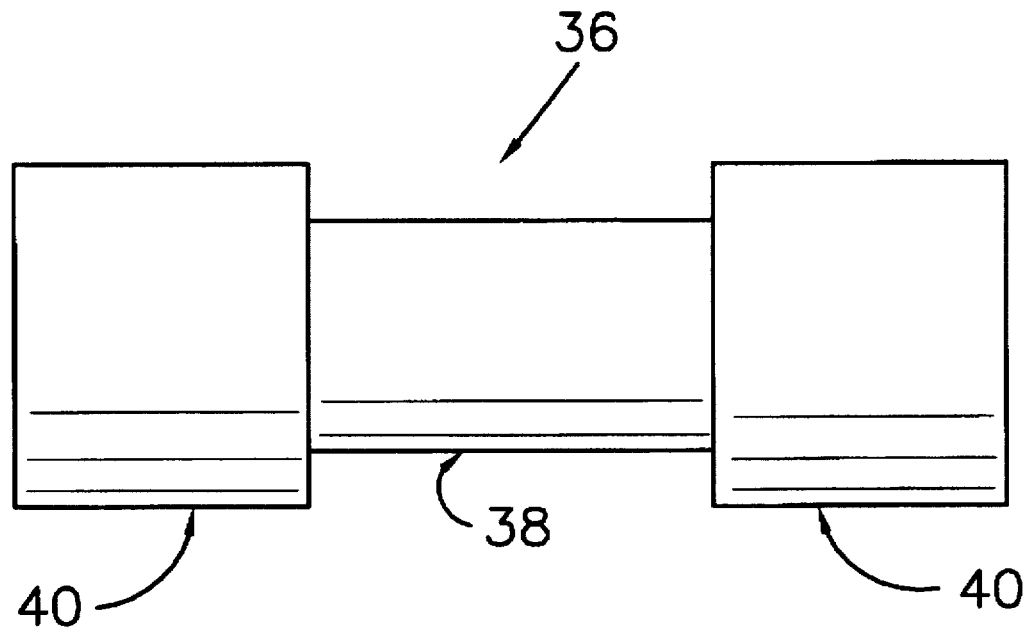
FIG. 3 shows a side view of an alternative embodiment of an anchor component of the strap assembly embodiment shown in FIG. 1.

Referring now to FIG. 3, an alternative embodiment of the anchor used in strap assembly 10 is generally designated by the numeral "36". Anchor 36 defines a channel 38 about its circumference which is defined by a pair of caps 40 which are mounted at both ends of anchor 36. Anchor 36 is preferably formed from plastic "PVC" type pipe components. For example, anchor 36 is optionally formed from a ½" schedule 40 pipe nipple with ½" schedule 40 pipe caps adhered to the pipe nipple.

Although several possible embodiments of an anchor have been described with reference to FIGS. 1–3, many other possible shapes and materials are contemplated so long as the purpose of providing an anchor as described herein is not frustrated.

Figure 4:
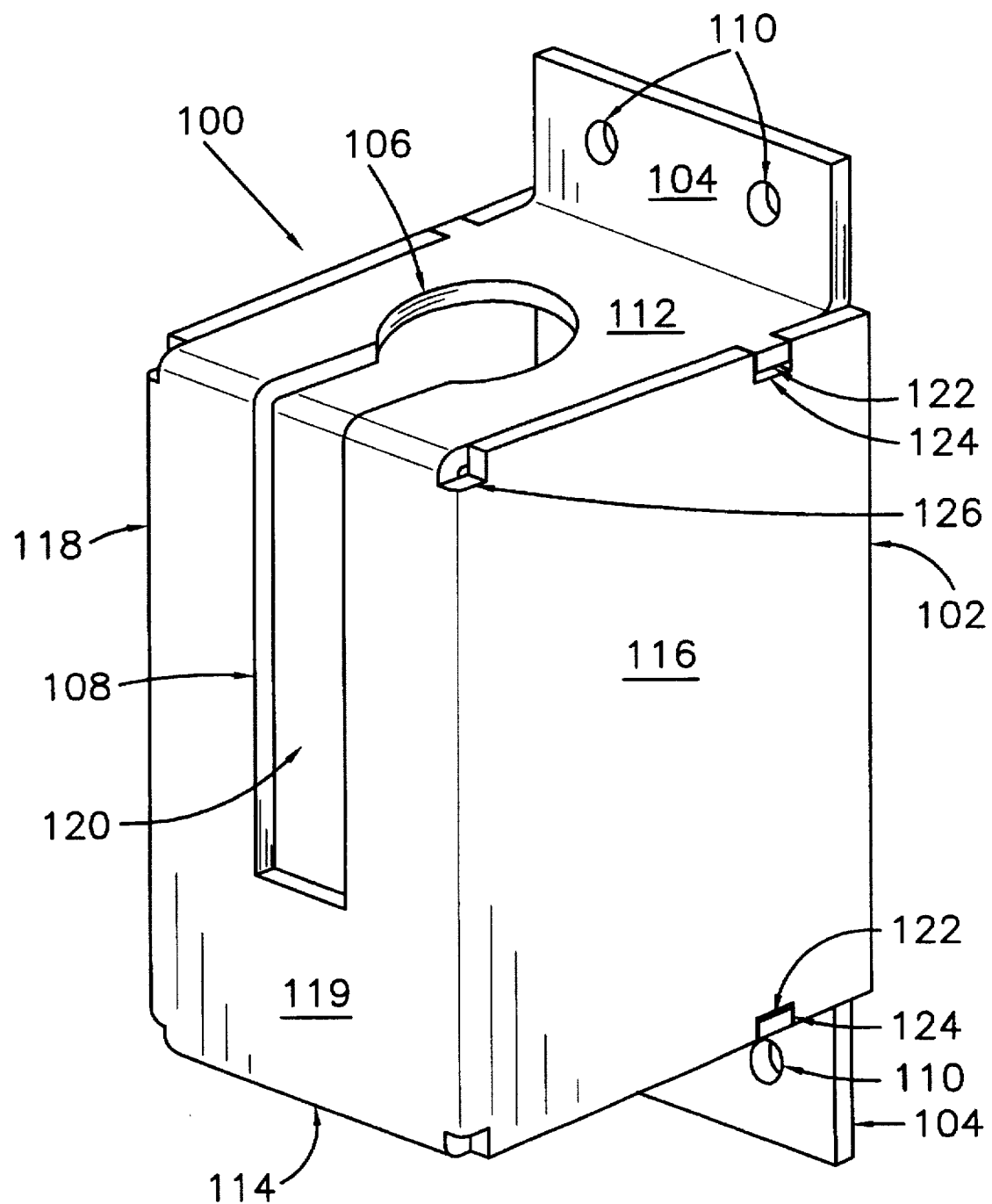
FIG. 4 shows a perspective view of the bracket embodiment shown in FIG. 1.
Figure 5:
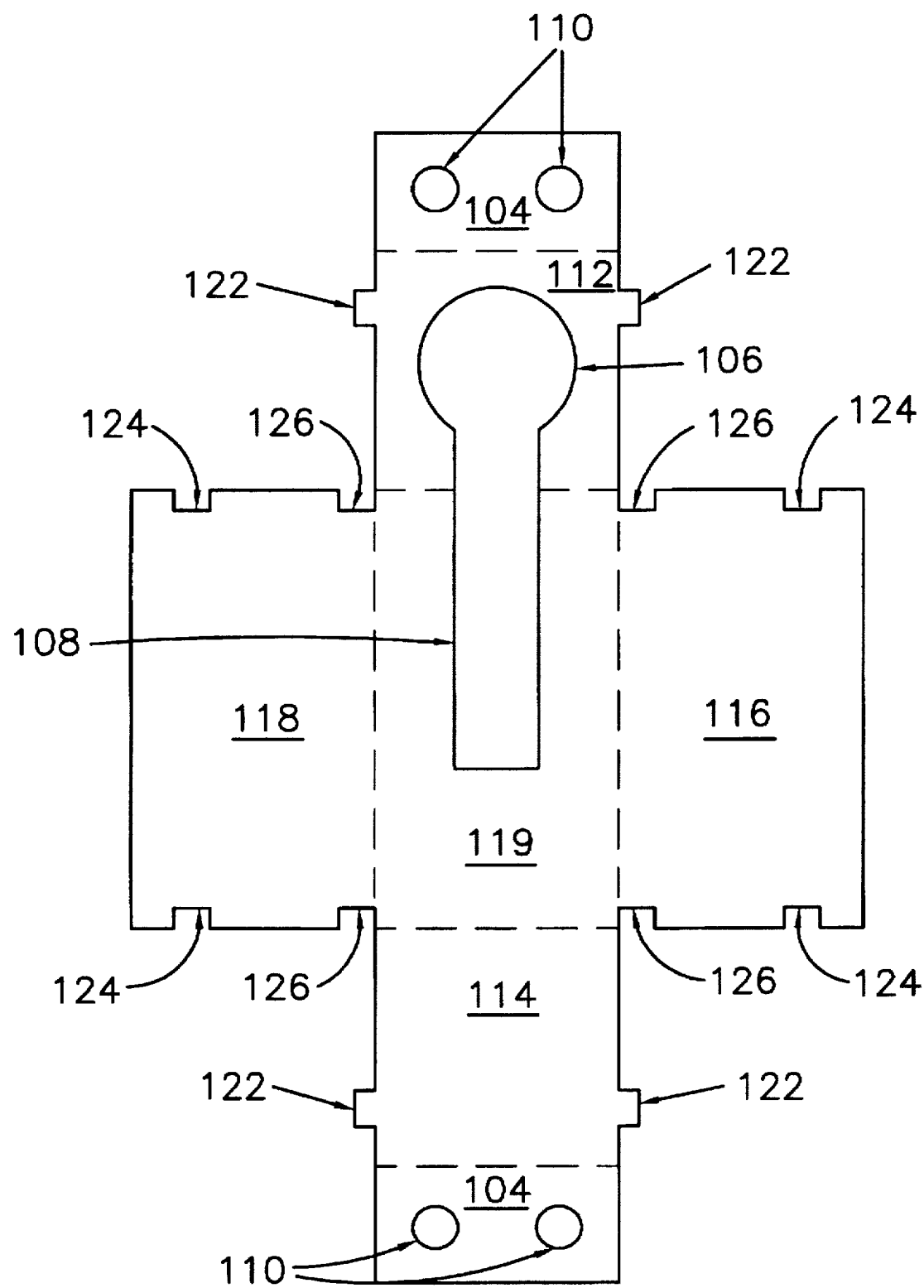
FIG. 5 shows a front view of the bracket embodiment shown in FIG. 1 prior to assembly.

Referring now to FIGS. 4 and 5, details of bracket 100 will now be described. FIG. 4 shows bracket 100 in its final manufactured condition, and FIG. 5 shows bracket 100 in the form of a sheet before it has been formed into the condition shown in FIG. 4.

Bracket 100 includes a bracket housing 102 attached to mounting portions 104. Opening 106 and slot 108 are provided for the purpose and function described with reference to FIG. 1. Mounting holes 110 are provided in mounting portions 104 so that a standard fastener can be used to attach bracket 100 to a surface of a structure such as a wall, ceiling, post, beam, or other structure. Bracket housing 102 comprises a top panel 112, a bottom panel 114 (see FIG. 5), a side panel 116, a side panel 118 (see FIG. 5), and a front panel 119. Opening 106 is formed in top panel 112 and slot 108 extends from top panel 112 onto front panel 119.

Defined by the panels of bracket 100 is an interior region 120. Interior region 120 is sized and shaped to accommodate anchor 14, anchor 36, or whatever anchor is selected for use with the strap assembly.

As is best illustrated in FIG. 5, bracket 100 is most preferably formed from metallic sheet which can be stamped or otherwise machined into the form illustrated in FIG. 5. Bracket 100 is optionally formed from a suitable plastic material as well, using any known forming method such as injection molding and the like. Provided on the blank form shown in FIG. 5 are the various panels as well as tabs 122 and notches 124. These tabs and notches mate with one another when bracket 100 is folded into the condition shown in FIG. 4. The tabs and notches cooperate to strengthen bracket 100 and to assist in the manufacturing of bracket 100 as it is converted from the form illustrated in FIG. 5 to the form illustrated in FIG. 4.

Figure 6:
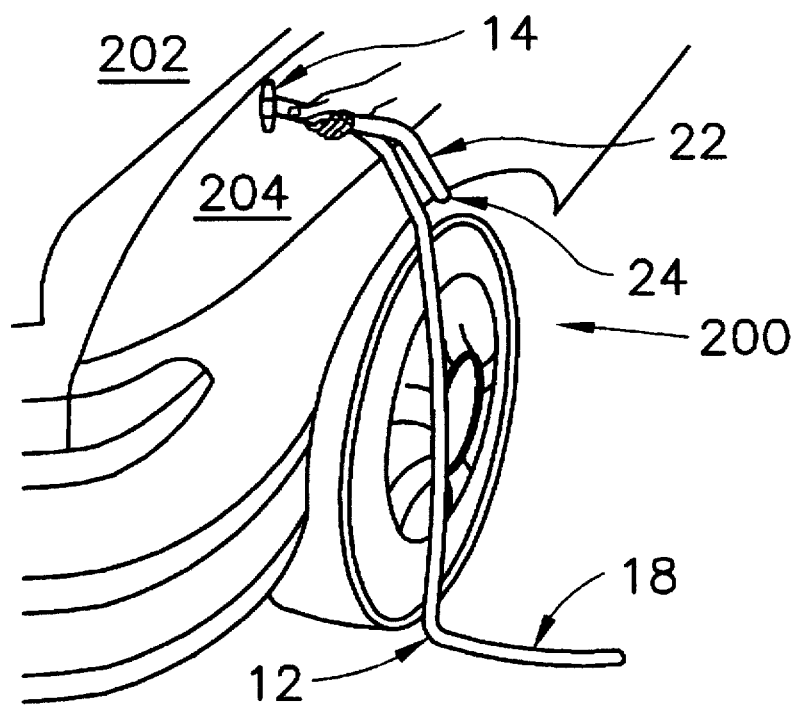
FIGS. 6 and 7 illustrate the manner in which the strap assembly embodiment shown in FIG. 1 is used in conjunction with an automobile.
Figure 7:
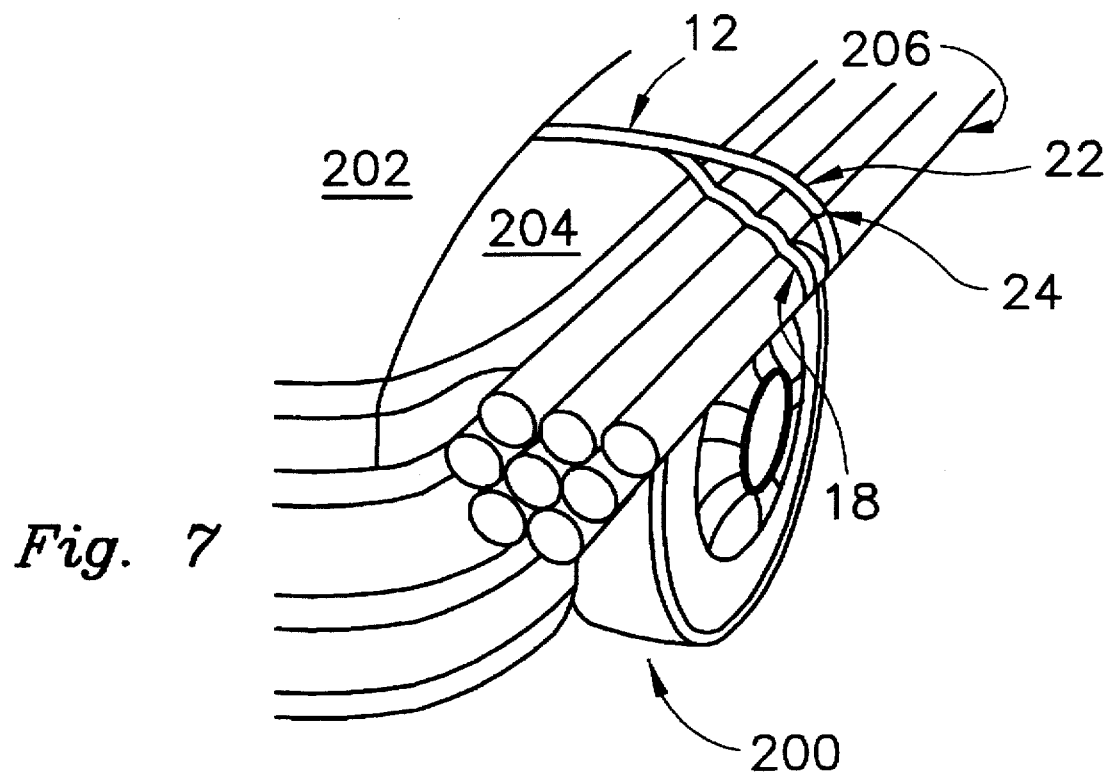

Referring now to FIGS. 6 and 7, an example of one possible use of strap assembly 10 will now be described. In this example, strap assembly 10 is utilized to secure an elongated object or objects such as pipes to the side of an automobile so that the pipes can be transported from one location to another. An automobile or vehicle 200 in this example has a trunk panel 202 and a quarter panel 204. Trunk panel 202 is pivotable with respect to quarter panel 204 between an opened and a closed position. As illustrated in FIG. 6, anchor 14 of strap assembly 10 is positioned within the trunk compartment of vehicle 200 while trunk panel 202 is opened with respect to quarter panel 204. When closed, trunk panel 202 cooperates with quarter panel 204 to capture anchor 14 within the trunk yet permits first length 18 and second length 22 of elongated strap 12 to extend from the trunk compartment, between trunk panel 202 and quarter panel 204, and outwardly from vehicle 200. Accordingly, second length 22 and fastener 24 remain exposed and first length 18 of elongated strap 12 is also exposed.

Referring now to FIG. 7, it can be seen that longer first length 18 of elongated strap 12 is wrapped around the objects to be transported. The free end portion of first length 18 is then engaged by fastener 24 on the end of second length 22, thereby securely engaging objects 206 with respect to vehicle 200.

Although not shown in FIGS. 6 or 7, a second strap assembly is optionally used to separately engage the object. For example, an anchor of a second strap assembly can be captured in the engine compartment of vehicle 200 and the strap can be used to engage another end of an elongated object.

Although FIGS. 6 and 7 illustrate positioning of an anchor of a strap assembly between the trunk- and quarter-panels of an automobile, it can be used between other panels and with other vehicles. For example, a strap assembly anchor is optionally positioned between a hatchback and adjacent panels, between a door and adjacent panels, and between the tailgate of a pick-up truck and adjacent panels.

It is contemplated that many modifications can be made to the embodiments shown for the purpose of illustration in the drawings. For example, the materials, proportions, dimensions, and specific shapes illustrated in the drawings can be modified depending upon design and manufacturing considerations.

In any embodiment, a strap assembly according to this invention provides several significant benefits. For example, the strap assembly can be used to secure objects adjacent to the exterior of a vehicle without the need for additional materials such as ropes or ties or other components. Also, a strap assembly according to this invention can be used in conjunction with a bracket in order to secure objects adjacent to a building or other structure.

In one embodiment of this invention, a strap assembly is optionally provided together with a bracket in the form of a kit. Such a kit uniquely permits the use of the strap assembly to perform at least two independent functions. For example, the strap assembly can be used in conjunction with a vehicle such as an automobile to secure and transport objects that cannot fit within the interior of the vehicle. The same strap assembly can be used in conjunction with the bracket to secure objects adjacent to a building structure such as the wall of a garage, the ceiling or beam of a basement, or any other stationary or movable structure to which objects are desirably secured. Also, the kit can contain more than one strap assembly and/or bracket. Moreover, the kit can advantageously contain extra anchors 14 whereby temporary loops may be formed at additional locations along strap 12 and the loops filled with extra anchors 14 to create multiple capture locations.

While specific embodiments are illustrated in the drawings and described with reference thereto, it should be understood that additional modifications can be made without departing from the spirit or the scope of this invention as it is defined in the appended claims.

What is claimed is:

1. A strap assembly for securing an object to a vehicle, wherein a portion of said strap assembly is adapted to be captured by adjacent panels of said vehicle, and wherein a portion of said strap assembly is adapted to engage said object, said strap assembly comprising:

an elongated strap having a predetermined length and opposed end portions;

an anchor attached to said elongated strap at a location along said predetermined length of said elongated strap and between said opposed end portions of said elongated strap, said anchor being shaped to be captured by said adjacent panels of said vehicle, said anchor having a longitudinal axis and a surface defining a channel oriented in a direction substantially perpendicular to said longitudinal axis, wherein a portion of said elongated strap is positioned within said channel to prevent separation of said anchor and said elongated strap and to substantially prevent movement of said anchor with respect to said elongated strap in a direction along said longitudinal axis of said anchor, wherein said location of said anchor defines a first length of said elongated strap extending between said anchor and one end portion of said elongated strap and a second length of said elongated strap extending between said anchor and the other end portion of said elongated strap;

a fastener connected to one of said first and second lengths of said elongated strap, said fastener being adapted for engagement to the other one of said first and second lengths of said elongated strap;

wherein in operation said anchor is captured by said adjacent panels of said vehicle, said first and second lengths of said elongated strap extend outwardly from said panels of said vehicle, and said fastener engages said first and second lengths of said elongated strap to secure said object adjacent to said vehicle so that said object can be transported safely and easily with said vehicle.

2. The strap assembly defined in claim 1, wherein said fastener is connected to said first length of said elongated strap and wherein said first length is shorter than said second length.

3. The strap assembly defined in claim 1, wherein said fastener comprises a pair of metallic rings.

4. The strap assembly defined in claim 1, wherein said fastener comprises a clasp.

5. The strap assembly defined in claim 1, wherein said anchor is substantially cylindrical in shape.

6. The strap assembly defined in claim 5, wherein said surface of said anchor includes a taper along said longitudinal axis from a location adjacent to said channel and extending to an end of said anchor, and wherein said elongated strap comprises a loop that is captured within said channel by sliding said loop over said taper and into said channel.

7. The strap assembly defined in claim 5, wherein said anchor comprises a substantially tubular body and a cap mounted at each end of said tubular body.

8. A bracket for mounting a strap assembly having an elongated strap and an anchor attached to said elongated strap, said bracket being adapted for mounting to a surface of a structure, said bracket comprising:
- a bracket housing formed from a sheet and shaped for positioning adjacent to said surface of said structure, said bracket housing and said surface of said structure together defining an interior region shaped to accommodate said anchor of said strap assembly;
- an opening defined by said bracket housing, said opening being shaped to receive said anchor of said strap assembly and being positioned for insertion of said anchor of said strap assembly through said opening and into said interior region defined by said bracket housing and said surface of said structure;
- a slot defined by said bracket housing extending from said opening, said slot being shaped to receive a portion of said strap of said strap assembly and being positioned for extending said strap outwardly from said anchor and through said slot to a position outside said bracket housing; and
- a mounting portion connected to said bracket housing and positioned for attachment of said bracket to said surface of said structure.

9. The bracket defined in claim 8, wherein said bracket housing comprises substantially planar surfaces, and wherein said opening is defined by a first planar surface of said bracket housing and said slot extends from said opening into a second planar surface that is adjacent to said first planar surface and substantially perpendicular to said first planar surface.

10. The bracket defined in claim 9, wherein said first planar surface is substantially perpendicular to said surface of said structure.

11. The bracket defined in claim 9, wherein said second planar surface is substantially parallel to said surface of said structure.

12. The bracket defined in claim 8, having a one-piece construction.

13. The bracket defined in claim 8, formed from metallic sheet.

14. The bracket defined in claim 8, wherein said mounting portion comprises at least one flange extending outwardly from said bracket housing for positioning parallel and adjacent to said surface of said structure.

15. A kit for securing an object adjacent to a vehicle and for securing an object adjacent to a surface of a structure, said kit comprising, in combination:
- a strap assembly comprising an elongated strap, an anchor attached to said elongated strap at a location between opposed ends of said elongated strap, and a fastener connected to one of said opposed ends of said elongated strap;
- a bracket adapted for mounting to said surface of said structure, said bracket comprising a housing defining together with said surface of said structure an interior region shaped to accommodate said anchor of said strap assembly, an opening defined by said housing shaped to receive said anchor of said strap assembly, a slot defined by said housing extending from said opening and shaped to receive a portion of said strap of said strap assembly, and a mounting portion connected to said housing and positioned for attachment of said bracket to said surface of said structure;
- wherein said anchor of said strap assembly is shaped to be captured by adjacent panels of said vehicle so that said opposed ends of said elongated strap extend outwardly from said adjacent panels of said vehicle, said fastener on said strap assembly connecting said opposed ends of said elongated strap to secure said object so that it can be transported safely and easily adjacent to said vehicle; and
- wherein said anchor of said strap assembly is shaped to be inserted through said opening defined by said housing into said interior region of said housing, said opposed ends of said strap extending outwardly from said anchor from within said housing and through said slot of said housing, said fastener on said strap assembly connecting said opposed ends of said elongated strap to secure said object adjacent to said structure.

16. The kit defined in claim 15, wherein said anchor of said strap assembly has a longitudinal axis and a surface defining a channel oriented in a direction substantially perpendicular to said longitudinal axis, wherein a portion of said elongated strap is positioned within said channel to prevent separation of said anchor and said elongated strap and to substantially prevent movement of said anchor with respect to said elongated strap in a direction along said longitudinal axis of said anchor.

17. The kit defined in claim 15, wherein said location of said anchor defines a first length of said elongated strap extending between said anchor and one end of said elongated strap and a second length of said elongated strap extending between said anchor and the other end of said elongated strap.

18. The kit defined in claim 17, wherein said fastener is connected to said first length of said elongated strap and wherein said first length is shorter than said second length.

19. The kit defined in claim 15, wherein said housing of said bracket comprises substantially planar surfaces, and wherein said opening is defined by a first planar surface of said housing and said slot extends from said opening into a second planar surface that is adjacent to said first planar surface and substantially perpendicular to said first planar surface.

20. The kit defined in claim 19, wherein said first planar surface is substantially perpendicular to said surface of said structure and said second planar surface is substantially parallel to said surface of said structure.

21. The kit defined in claim 15, wherein said anchor is substantially hollow.

* * * * *